Nov. 1, 1966 C. M. TUTTLE ETAL 3,282,183
PHOTOGRAPHIC APPARATUS FOR RECORDING, PROCESSING, AND
PROJECTING DATA FOR RAPID VISUAL INSPECTION
Filed April 13, 1964
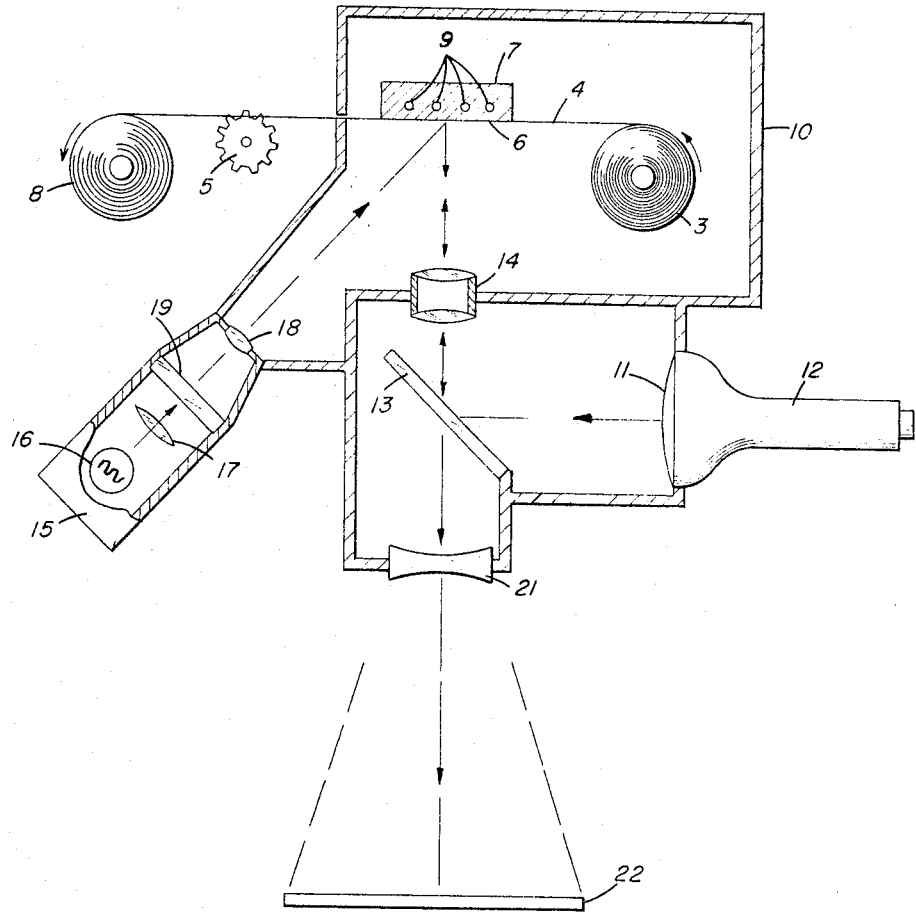
CLIFTON M. TUTTLE
FRANK H. JACKSON
INVENTORS
BY
ATTORNEYS

United States Patent Office 3,282,183
Patented Nov. 1, 1966

3,282,183
PHOTOGRAPHIC APPARATUS FOR RECORDING, PROCESSING, AND PROJECTING DATA FOR RAPID VISUAL INSPECTION
Clifton M. Tuttle, Lenox, Mass., and Frank H. Jackson, Rochester, N.Y., assignors to Eastman Kodak Company, Rochester, N.Y., a corporation of New Jersey
Filed Apr. 13, 1964, Ser. No. 359,169
5 Claims. (Cl. 95—12)

This invention relates generally to a photographic apparatus, and more specifically to an improved photographic apparatus for simultaneously recording, processing and illuminating data for projection onto a screen for rapid visual inspection.

There are occasions in photographic work in which extremely fast viewing of data is desired; that is, in which it is desired to reduce to a minimum the time interval between the recording of data on a photographic material and the viewing of it. For example, in radar photography, it is necessary to minimize this time interval as much as possible. Photographic apparatus for use in radar photography for recording data on a photographic material at one station, advancing the material to a second station for processing, and subsequent projection of the data on a screen is disclosed in U.S. Patent 2,688,278, C. M. Tuttle, September 7, 1954. Another apparatus of this type for recording data on a photographic material at one station, immediately processing the exposed data at the same station, and advancing the material to a second station for projecting the data on a screen for viewing is disclosed in U.S. Patent No. 2,856,829, C. Orlando, October 21, 1958. Although the prior art devices may operate satisfactorily, a time delay is present as the photographic material is advanced from the recording station to the projecting station. This objectionable time delay is eliminated by applicants' improved photographic apparatus which at one station simultaneously records data on a photographic material in the form of a latent image, processes the latent image to a visible image, and illuminates the visible image for projection onto a screen for viewing.

One of the objects of the present invention is to provide a photographic apparatus which at one station simultaneously records data onto a photographic material in the form of a latent image, processes the latent image to a visible image, and illuminates the visible image for projection onto a screen for viewing.

Another object of the invention is to provide a photographic recording and processing apparatus in which the access time from recording to viewing is reduced to a minimum.

Another object of the invention is to provide an improved photographic recording, processing and projecting apparatus having a light source that supplies heat energy for processing a latent image, and non-actinic wavelengths of light for illuminating the processed image for projection.

Another object of the invention is to provide an improved photographic apparatus of simple design and construction, thoroughly reliable and efficient in operation, and economical to manufacture.

Objects and advantages other than those set forth above will be apparent from the following description when read in connection with the accompanying drawing showing a schematic view of a photographic apparatus constructed in accordance with one embodiment of this invention.

Referring to the drawing, a photographic apparatus is schematically disclosed having a supply roll 3 of photosensitive photographic web material 4 coated with a silver halide emulsion, some or all of the processing chemicals as well as some water moisture having been incorporated in the web or in an additional layer added thereto. An emulsion of this type is disclosed in French Patent No. 1,257,893, Stewart et al., delivered February 27, 1961. This photographic material 4 has the characteristic which is inherent in many well known films of being sensitive to certain actinic wavelengths of light, and insensitive to non-actinic wavelengths of light. The ranges of the actinic and non-actinic light may vary, depending upon the particular photographic material involved. In one instance, the actinic range may cover wavelengths in the blue and ultraviolet regions of the spectrum, and the non-actinic range may cover wavelengths in the spectrum such as those in the green, red, and infrared regions. This photographic material 4 further produces an image when exposed to actinic radiation, and simultaneously or subsequently subjected to heat by infrared radiation from a lamp 16, or by any other suitable heating means such as a heated block 7. Heat developable film or paper is disclosed in the above-referred to French patent and hence will not be described in further detail.

The web of photographic material 4, which may be a perforated film, is advanced preferably a frame at a time by a sprocket 5 or other suitable means across the lower surface 6 of heated block 7 and onto a take-up roll 8. The block 7 may be heated by any suitable heating means such as imbedded resistive elements 9 through which an electrical current is passed. The web 4 is transported preferably with its base in engagement with heated block 7 (emulsion side out) to assist lamp 16 in heating the photographic material 4 causing the moisture therein to vaporize and to react with the emulsion for processing same. The temperature of block 7 and the quantity of heat required for suitable processing is, of course, dependent upon the characteristics of the particular heat developable film or paper being used.

Since the web 4 may be sensitive to certain wavelengths of light occurring under normal daylight conditions, it is preferable to house supply roll 3 and block 7 in any suitable light-tight housing 10.

The data to be recorded on the photographic material 4 may be data such as a radar display appearing on a face 11 of a cathode ray tube 12. The cathode ray tube 12 emits a light image of the data which is directed against a dichroic mirror 13. Since mirror 13 is coated to transmit non-actinic wavelengths of light, and reflect actinic wavelengths of light, the actinic light image is reflected through a lens unit 14 which focuses the actinic image onto the emulsion of the photographic material 4. A latent image is formed thereon which is immediately processed to a visible image by heat supplied thereto by lamp 16 and heated block 7. If desired, the face 11, mirror 13, and lenses 14, 21 may also be suitably housed to minimize interference from daylight conditions. A lamp house 15 housing an optical unit comprising lamp 16, lenses 17, 18, and a filter 19 provides a source of long wavelength radiation including visible energy beyond the actinic range which is directed onto the latent image on the photographic material 4. This source of radiation serves to both heat the photographic material to process the latent image to a visible image, and to illuminate it with non-actinic light so that the visible image formed thereon will pass through mirror 13, which transmits non-actinic light, and be projected onto screen 22 by lenses 14 and 21 for viewing. The filter 19 filters out the actinic wavelengths of light energy and allows only the wavelength of radiant energy, including infrared and visible energy beyond the actinic range to pass therethrough. It is clear, therefore, that the optical unit serves the dual function of supplying non-actinic infrared radiation to the latent image on the photographic material 4 for processing it to a visible image, and also supplying the non-actinic visible illumination thereto to allow projection of the visible image onto viewing screen 22. Although the heat produced by light source 16 and/or block 7 may cause some desensitization of the photographic material 4 before the exposure is complete, resulting from the fact that the exposing and processing actions are taking place simultaneously, the material retains sufficient sensitivity so that a latent image is formed upon exposure to actinic wavelengths of the light image.

The invention has been described in detail with particular reference to one embodiment thereof, but it will be understood that variations and modifications can be effected within the spirit and scope of the invention as described hereinabove, and as defined in the appended claims.

We claim:

1. In a photographic apparatus for rapidly recording light data of the type produced by a cathode ray tube, on a photosensitive material that requires heat for processing, and which is suitable for projection onto a viewing screen, the combination comprising:
   means for positioning an area of said photosensitive material at one station;
   exposing means for directing light data on said area at said one station to expose said area and to form a latent image of said data thereon; and
   means at said one station operating simultaneously with said exposing means for simultaneously (1) processing by the use of heat said latent image to a visible image, and (2) illuminating said visible image as it is being formed for projection onto a screen for viewing, and including
   means for directing non-actinic radiation comprising visible radiant energy and radiant energy rich in infrared onto said exposed area.

2. The invention according to claim 1 wherein said radiant energy directing means comprises a lamp also emitting actinic radiant energy, and a lens system for collating light from said lamp and directing it onto said area.

3. The invention according to claim 2 wherein said radiant energy directing means includes a filter for filtering out said actinic radiant energy.

4. In a photographic apparatus for rapidly recording light data of the type produced by a cathode ray tube on a photosensitive material in the form of a latent image, the photosensitive material being of the type which is sensitive to actinic wavelengths of light radiation and insensitive to non-actinic wavelengths of light radiation comprising infrared and visible radiation, processing the latent image to a visible image by heat, and projecting the visible image onto a viewing screen, the combination comprising:
   means for positioning an area of said photosensitive material at one station;
   exposing means for directing actinic wavelengths of light data on said area at said one station to form a latent image of said data thereon;
   means operating simultaneously with said exposing means for simultaneously (1) processing said latent image to a visible image, and (2) illuminating said visible image as it is being formed, at said one station and including
   means for directing infrared and visible radiation onto said exposed area; and
   means including a part of said exposing means for projecting the illuminated visible image onto a viewing screen.

5. The invention according to claim 4 wherein said part of said exposing means comprises a dichroic mirror for reflecting actinic radiation from said cathode ray tube onto said area, and transmitting non-actinic radiation from said illuminated visible image to said viewing screen.

References Cited by the Examiner

UNITED STATES PATENTS

| 2,688,278 | 9/1954 | Tuttle | 95—14 |
| 3,051,044 | 8/1962 | McNaney | 88—24 |
| 3,115,815 | 12/1963 | Friedel | 95—4.5 |
| 3,200,724 | 8/1965 | Stamm | 95—12 |

FOREIGN PATENTS 1,176,183   11//1958   France.

JOHN M. HORAN, *Primary Examiner.*